(12) United States Patent
Yeung

(10) Patent No.: US 8,995,728 B1
(45) Date of Patent: *Mar. 31, 2015

(54) VISUAL SECURITY MECHANISM FOR A DEVICE WITH A FRONT-FACING CAMERA

(71) Applicant: Google Inc., Mountain View, CA (US)

(72) Inventor: Bryan Russell Yeung, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,272

(22) Filed: Jul. 7, 2014

Related U.S. Application Data

(63) Continuation of application No. 13/308,379, filed on Nov. 30, 2011, now Pat. No. 8,805,029.

(51) Int. Cl.
*G06K 9/00* (2006.01)

(52) U.S. Cl.
CPC .................................. *G06K 9/00261* (2013.01)
USPC ........... 382/115; 382/209; 382/116; 382/118; 382/124; 382/125; 382/126; 382/127; 713/186

(58) Field of Classification Search
CPC ...... G06F 21/32; G06F 21/31; H04L 63/0861
USPC ......... 382/115, 209, 116, 118, 124, 125, 126, 382/127; 713/186
See application file for complete search history.

(56) References Cited

U.S. PATENT DOCUMENTS

| 5,548,660 | A | 8/1996 | Lemelson | |
|---|---|---|---|---|
| 8,805,029 | B1 | 8/2014 | Yeung | |
| 2004/0234109 | A1* | 11/2004 | Lemelson et al. | 382/118 |
| 2007/0242887 | A1 | 10/2007 | Matsushita et al. | |
| 2009/0316960 | A1 | 12/2009 | Wang | |
| 2011/0067098 | A1 | 3/2011 | Nelson et al. | |
| 2011/0230255 | A1* | 9/2011 | Steeves | 463/25 |
| 2012/0019359 | A1 | 1/2012 | Lung | |
| 2013/0015946 | A1* | 1/2013 | Lau et al. | 340/5.2 |

\* cited by examiner

*Primary Examiner* — Mike Rahmjoo
(74) *Attorney, Agent, or Firm* — McDermott Will & Emery LLP

(57) ABSTRACT

Disclosed herein are methods, systems, and computer readable media for locking a computing device. Periodic images are received from a camera on a computing device. Each of the images is compared to a stored image of a user. A determination is made that one of the images does not match the stored image, and the computing device is locked upon determining that one of the images does not match the stored image.

20 Claims, 4 Drawing Sheets

VISUAL SECURITY MECHANISM FOR A DEVICE WITH A FRONT-FACING CAMERA

CROSS-REFERENCE TO RELATED APPLICATIONS

This application is a continuation of U.S. patent application Ser. No. 13/308,379, filed Nov. 30, 2011, entitled "VISUAL SECURITY MECHANISM FOR A DEVICE WITH A FRONT-FACING CAMERA". The contents of the application are incorporated herein in their entirety by reference.

BACKGROUND

Computing devices are used by a wide variety of users. They can be used by a single person or by more than one person together at a single time. These computing devices are often equipped with methods to lock the computing device by the user. For example, the user can lock the screen when they decide they are going to be away from the computing device for a long time. Some computing devices can be set to automatically lock after a certain amount of time. However, the user has to remember to set this functionality in their computing device.

BRIEF SUMMARY

In general, one innovative aspect of the subject matter described in this specification may be embodied in a method that includes the actions of receiving periodic images from a camera on a computing device; comparing each of the images to a stored image of a user; determining that one of the images does not match the stored image; and locking the computing device upon determining that one of the images does not match the stored image. Other embodiments of this aspect include corresponding systems, apparatus, and computer programs, configured to perform the actions of the methods, encoded on computer storage devices.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 1. is an example diagram of a screen locking mechanism being shown.

DETAILED DESCRIPTION

Cameras used with computing devices can be used in helping lock a computing device when persons that are not authorized users are seen using the computing device. Images of authorized users can be stored and compared against images of persons using the computing device, and depending on who is using a device, the device can be locked.

Figure 1:
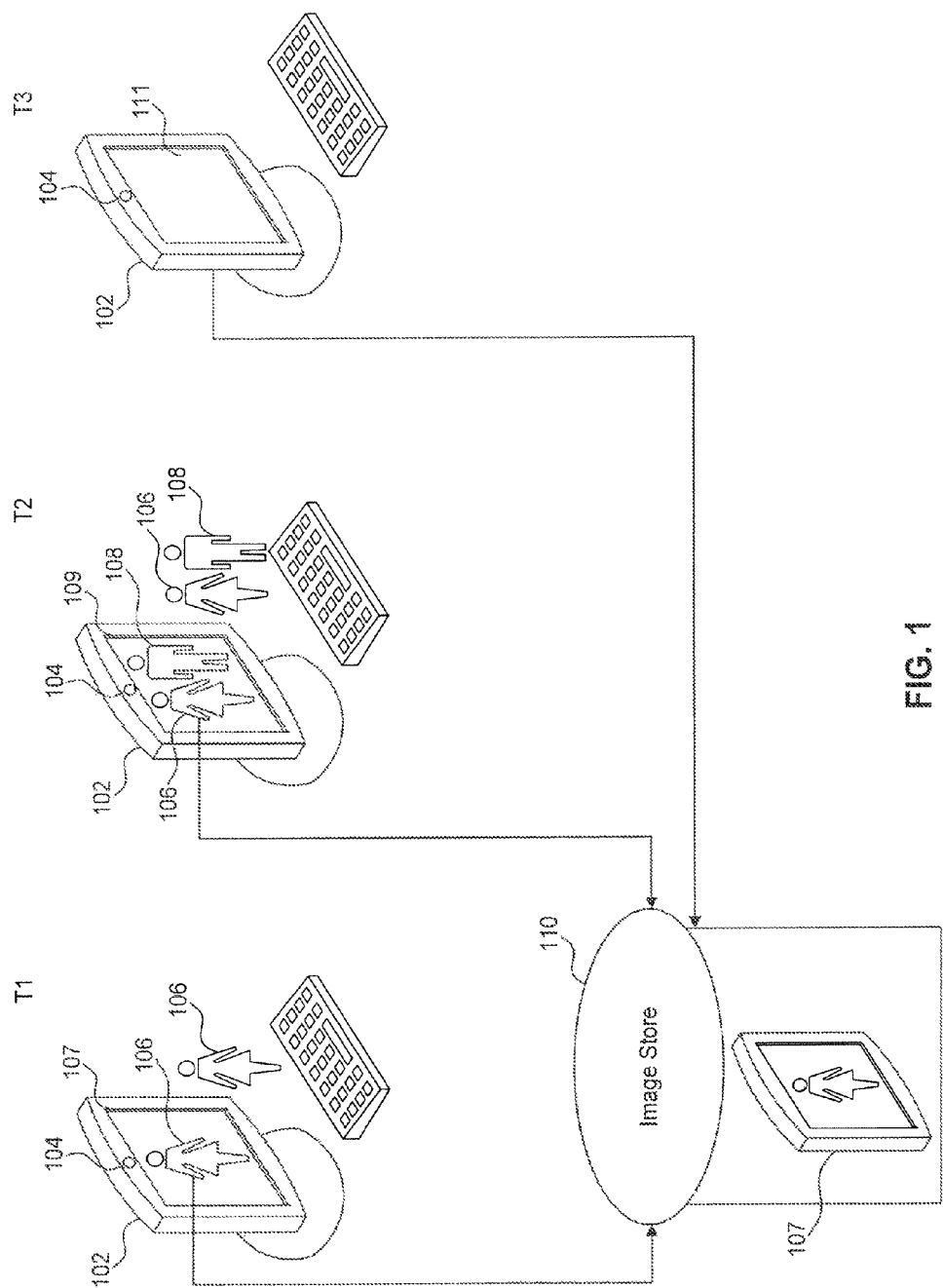

FIG. 1 displays a computing device 102 at three different time periods T1, T2, and T3. Computing device 102 may be, for example and without limitation, a device such as a desktop computer, laptop computer, mobile device, tablet computer, set top box.

A user 106 at time T1 is using computing device 102. User 106 may be the owner of computing device 102. In one implementation, a camera 104 of the computing device 102 can be used to take an image 107 of the user 106 and the image 107 can be stored in a database 110 that is remotely connected to computing device 102, or can be part of the computing device 102. In another implementation, the authorized user can provide an image 107 himself/herself to the computing device 102 to store as the image of the authorized user.

Periodically camera 104 can take an image 109 of the user that is using computing device 102. At T2, camera 104 captures user 106 as well as user 108 in front of computing device 102. Computing device 102 can compare the image 109 taken of the user 106 and 108 and the image 107 stored in database 110. Computing device 102 can determine that the image 109 does not match image 107, and upon this determination, computing device 102 can lock the computing device 102 and prevent further use.

In one implementation, computing device 102 can compare image 107 and 109 and as long as one recognizable face exists in the comparison of the two images, then the computing device 102 will remain unlocked. For example, at T2, the image 109 includes the user 106 and when computing device 102 compares image 109 and image 106, the face of user 106 is determined to be in both images and therefore computing device 102 remains unlocked.

In another implementation, if no person is seen using the computing device 102, then the computing device 102 is locked. For example at T3, computing device 102 takes an image of any person in front of computing device 102 and determines that the image 111 does not contain any face of a person. When comparing image 111 with image 107, no common face is found in the images and therefore the computing device 102 is locked.

In one implementation, the same procedure can be used to unlock the computing device 102. For example, if initially the computing device 102 is locked, image 109 and image 106 can be compared and because the face of the user 106 is in both images, the computing device 102 can be unlocked. If the user 106 was alone in image 109, then the two images 107 and 109 would have also matched and the computing device 102 would be unlocked.

Figure 2:
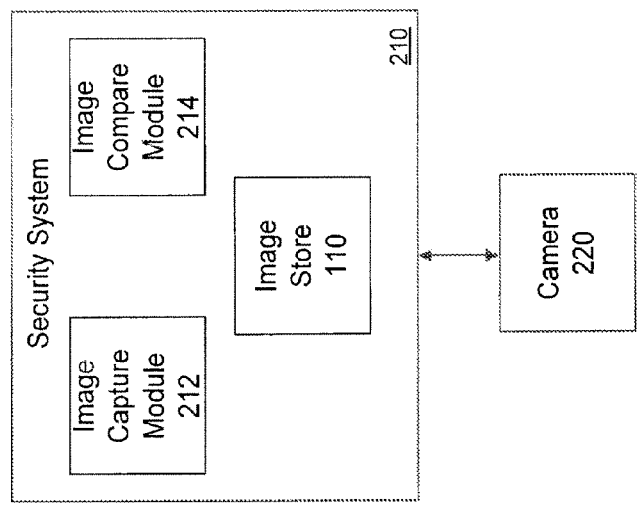
FIG. 2 illustrates an environment.

FIG. 2 illustrates an example system 200 for a client security system. System 200 includes security system 210 and camera 220. System 200 may be implemented on or implemented with a computing device. For example, security system 210 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, remote control, kiosk, embedded system or other device having at least one processor and memory. A computing device may include a communication port or I/O device for communicating over wired or wireless communication link(s).

Computing devices such as a monitor, all-in-one computer, smartphone, tablet computer, remote control, etc., may include a camera 220 that be either part the computing device or separate from it and connected to the computing device through an external connection.

Security system 210 can include an image capture module 212 and an image compare module 214. Initially, camera 220 can capture an image of one or more authorized users of the computing device. An authorized user can initiate camera 220 to take an image of the authorized user and the image can be stored in image store 110.

In one implementation, more than one image can be stored in the image store 110 as an authorized user. For example, there may be five authorized users of the computing device, then five images can be stored. In other implementations, a single image can capture one or more of the authorized users and the single image can be stored. In another implementation, multiple images can be stored for a single user.

As the computing device is used, image capture module 212 can periodically receive captured images of users using the computing device from camera 220. Each time an image is taken, the image compare module 214 receives the image and compares the received image and the stored image or images of authorized users in image store 110.

Image compare module 214 can use any image recognition technology to compare the two images and identify a match. For example, one or more edges, corner features, line features, interest points, blobs, regions of interest, or ridges in a stored image may match one or more of such a captured image. The techniques for image recognition are not limited to the ones listed.

In one implementation, features may be extracted from the images stored. Features may include, but are not limited to, edges, corner features, interest points, blobs or regions of interest, or ridges. Feature detection techniques may include, but are not limited to, canny edge detection, scale-invariant feature transform (SIFT), speeded up robust feature (SURF), and other known feature detection techniques.

In one implementation, facial detection techniques can be used. For example, the face-detection task as a binary pattern-classification task. That is, the content of a given part of an image is transformed into features, after which a classifier trained on example faces decides whether that particular region of the image is a face, or not.

In one embodiment, a match may be identified if the number of features that match between an image stored and a captured image meets a threshold. For example, a match may be identified only if five or more features match between a stored image and an image captured by the computing device camera. Defining such a threshold may increase the likelihood that the identified captured image corresponds to the stored images.

In one implementation, images can be taken by camera 220 as determined by a user. For example, the rate at which images can be taken can be set by the user to be every five minutes, or every thirty seconds. The rate can be changed by the user at any time.

Figure 3:
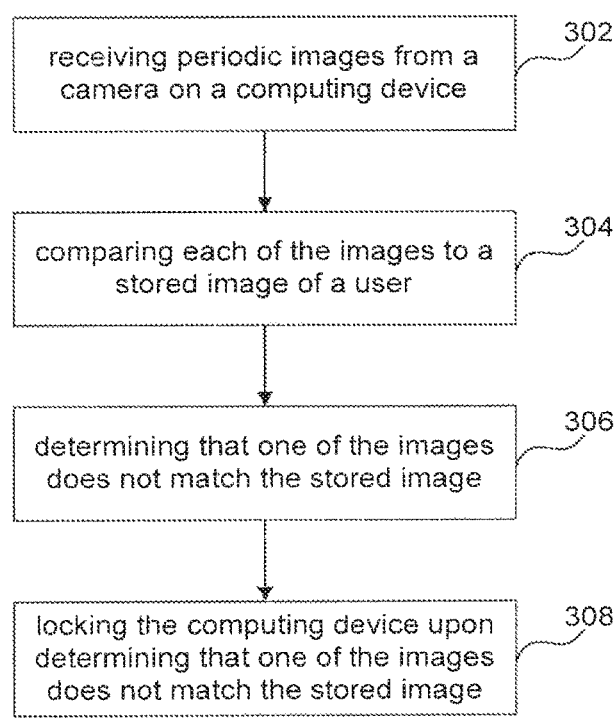
FIG. 3 is a flow diagram an example method.

FIG. 3 is a flow diagram of a method 300, in accordance with one embodiment. Method 300 can be implemented by security system 210.

At stage 302, periodic images are received from a camera on a computing device. The camera may be programmed to take an image of a subject in front of the computing device at a set interval, or every predetermined number of minutes. The image is then received by the computing device.

At stage 304, each of the images is compared to a stored image of a user. As described above, various feature recognition technologies can be used to compare the images. The stored image can be an image of the authorized user of the computing device.

At stage 306, a determination is made that one of the images does not match the stored image. The image can include one person or more than one person. The image compare module 214 can made a determination that one of the people in the image does not match the stored image. The image compare module 214 can for example, compare the features of the stored image to the features of the captured image to make this determination.

At stage 308, the computing device is locked upon determining that one of the images does not match the stored image. In one implementation, the screen can be locked. At that time, only the authorized user can unlock the screen.

In another implementation, the entire device can be turned off until the authorized user turns it back on.

In one implementation, the techniques described herein can be used for unlocking the device. For example instead of having to type a password to unlock the device, the techniques described can be used to unlock the device.

In one implementation, a stored image of an authorized user of the device can be stored. When a current user picks up the device, or sits in front of the device, and the device takes an image of the user, the image taken can be compared to the stored image. The features between the stored image and the image taken can be compared as described above, and if the features all match, or a predetermined number of features match, the device can be unlocked.

In one implementation, multiple images can be stored of an authorized user. Multiple images can be taken of the current user and a predetermined number of images are to match before the device can be unlocked. For example, the authorized user knows that he stored an image of himself smiling and an image of himself frowning. If the current user does not know this, and two images are taken of the current user, and matched against the smiling image and the frowning image, the features most likely will not match because the facial features of the smiling image and the frowning image will not match two images where the current user is not smiling and frowning.

In one implementation multiple images of a user are received from a camera on a computing device, and each of multiple images of the user received from the camera is compared to each of multiple stored images of the user. For example, if five images are received from the camera and two are stored of the user, each of the five is compared by the security system 210 to both stored images. If a predetermined number of the multiple images of the user match a predetermined number of the multiple stored images of the user, then security system 210 unlocks the computing device. For example, if a predetermined number of facial feature match in the two sets of images, then security system 210 can unlock the device.

In another implementation, the system can record a video of the authorized user performing a facial gesture (e.g. smiling), and the video can be stored. A video can then be taken of the current user. Several frames from that video of the gesture of the authorized user can be compared with reference frames of the video of the current user. The frames can be compared to determine if a predetermined number of frames match. In one implementation, the frames can be compared to determine if a predetermined number of features match between the frames. If the predetermined number of frames or the predetermined number of features match, the device can be unlocked.

Figure 4:
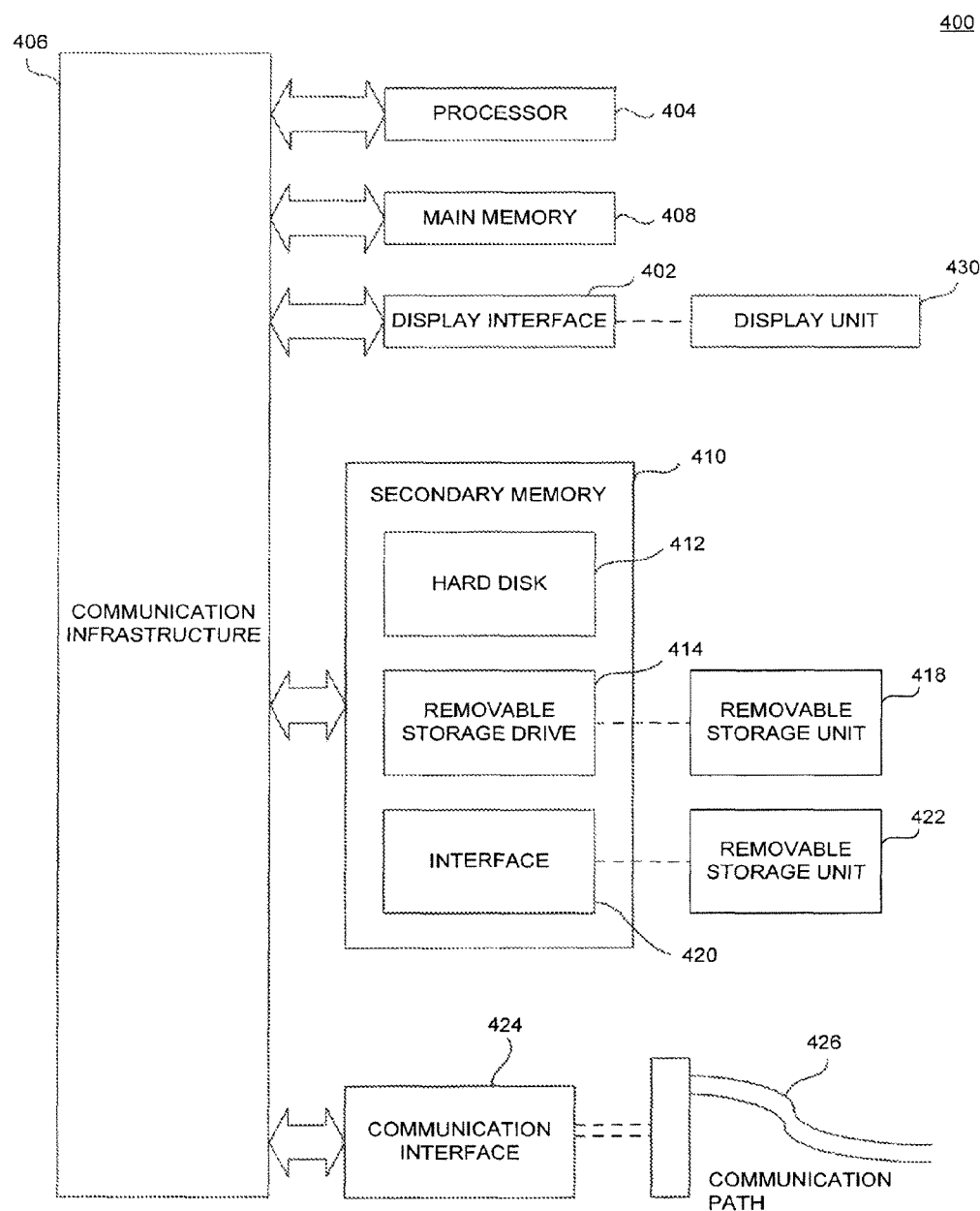
FIG. 4 is an example system.

Various aspects of the present invention can be implemented by software, firmware, hardware, or a combination thereof. FIG. 4 illustrates an example computer system 400 in which the embodiments, or portions thereof, can be implemented as computer-readable code. For example, computing device 200 carrying out method 300 of FIG. 3 can be implemented in system 400. Various embodiments of the invention are described in terms of this example computer system 400.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Computer system 400 includes one or more processors, such as processor 404. Processor can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive and/or a removable storage drive. Removable storage drive 414 may include a floppy disk drive, a magnetic tape drive, an optical disk drive, a flash memory, or the like. The removable storage drive 414 reads from and/or writes to removable storage unit 418 in a well-known manner. Removable storage unit 418 may include a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. For example, communications interface 424 may provide connectivity to a docking station or dock. Communications interface 424 may include a modem, a network interface (such as an Ethernet card), communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the term "computer readable storage medium" is used to generally refer to media such as removable storage unit 418, removable storage unit 422, and a hard disk installed in hard disk drive 412. Computer readable storage medium can also refer to one or more memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the embodiments as discussed herein. In particular, the computer programs, when executed, enable processor 404 to implement the processes of embodiments of the present invention, such as the steps in the methods discussed above. Accordingly, such computer programs represent controllers of the computer system 400. Where embodiments are implemented using software, the software may be stored in a computer program product and loaded into computer system 400 using removable storage drive 414, interface 420, or hard drive 412.

Embodiments of the invention also may be directed to computer program products comprising software stored on any computer-readable medium. Such software, when executed in one or more data processing device, causes a data processing device(s) to operate as described herein. Embodiments of the invention employ any computer useable or readable medium. Examples of tangible computer-readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Embodiments may be implemented in hardware, software, firmware, or a combination thereof. Embodiments may be implemented via a set of programs running in parallel on multiple machines.

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment,"

etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
    capturing images periodically from a camera on a computing device;
    comparing a captured image to another captured image to determine whether the captured images have in common an image of a user;
    determining that the captured images do not have in common the image of the user;
    locking the computing device upon determining that the captured images do not have in common the image of the user; and
    when each of the captured images contains images of multiple users, determining whether none of the multiple users in each of the captured images matches the stored image of an authorized user, and locking and preventing further operation of the computing device by each user of the multiple users in each of the captured images, upon determining that none of the multiple users in each of the captured images matches the stored image of the authorized user.

2. The method of claim 1, wherein the computing device is a mobile phone, a personal computer, or a tablet.

3. The method of claim 1, wherein the capturing images periodically from the camera on the computing device comprises:
    capturing an image every predetermined number of minutes from the camera on the computing device.

4. The method of claim 1, further comprising:
    receiving the image of the user from an owner of the computing device.

5. The method of claim 1, wherein the comparing each of the captured images to the stored image of the authorized user comprises:
    comparing one or more features of the captured image to one or more features of the other captured image.

6. The method of claim 1, wherein the camera is a front-facing camera installed on the computing device.

7. A system, comprising:
    one or more processors; and
    one or more storage devices storing instructions that are operable, when executed by the one or more processors, cause the one or more processors to perform operations comprising:
    capturing images periodically from a camera on a computing device;
    comparing a captured image to another captured image to determine whether the captured images have in common an image of a user;
    determining that the captured images do not have in common the image of the user;
    locking the computing device upon determining that the captured images do not have in common the image of the user; and
    when each of the captured images contains images of multiple users, determining whether none of the multiple users in each of the captured images matches the stored image of an authorized user, and locking and preventing further operation of the computing device by each user of the multiple users in each of the captured images, upon determining that none of the multiple users in each of the captured images matches the stored image of the authorized user.

8. The system of claim 7, wherein the computing device is a mobile phone, a personal computer, or a tablet.

9. The system of claim 7, wherein capturing images periodically from the camera on the computing device comprises:
    capturing an image every predetermined number of minutes from the camera on the computing device.

10. The system of claim 7, further comprising instructions, when executed by the one or more processors, cause the one or more processors to perform operations comprising:
    receiving the image of the user from an owner of the computing device.

11. The system of claim 7, wherein the comparing each of the images comprises:
    comparing one or more features of the captured image to one or more features of the other captured image.

12. The system of claim 7, wherein the camera is a front-facing camera installed on the computing device.

13. A non-transitory computer-readable medium storing software comprising instructions executable by one or more processors which, upon such execution, cause the one or more processors to perform operations comprising:
    capturing images periodically from a camera on a computing device;
    comparing a captured image to another captured image to determine whether the captured images have in common an image of a user;
    determining that the captured images do not have in common the image of the user;
    locking the computing device upon determining that the captured images do not have in common the image of the user; and
    when each of the captured images contains images of multiple users, determining whether none of the multiple users in each of the captured images matches the stored image of an authorized user, and locking and preventing further operation of the computing device by each user of the multiple users in each of the captured images, upon determining that none of the multiple users in each of the captured images matches the stored image of the authorized user.

14. The non-transitory computer-readable medium of claim 13, wherein the computing device is a mobile phone, a personal computer, or a tablet.

15. The non-transitory computer-readable medium of claim 13, wherein the capturing images periodically from the camera on the computing device comprises:

capturing an image every predetermined number of minutes from the camera on the computing device.

16. The non-transitory computer-readable medium of claim 13, further comprising: receiving the image of the user from an owner of the computing device.

17. The non-transitory computer-readable medium of claim 13, wherein the comparing each of the images to the stored image of the authorized user comprises:

comparing one or more features of the captured image to one or more features of the other captured image.

18. The non-transitory computer-readable medium of claim 17, wherein the one or more features include at least one of edges, corner features, interest points, regions of interest, or ridges.

19. The non-transitory computer-readable medium of claim 13, wherein the camera is a front-facing camera installed on the computing device.

20. The non-transitory computer-readable medium of claim 13, wherein the receiving of images periodically from the camera on the computing device comprises capturing images periodically from the camera on the computing device of a user that is using the computing device.

* * * * *